(12) United States Patent
Edelin et al.

(10) Patent No.: US 10,669,915 B2
(45) Date of Patent: Jun. 2, 2020

(54) SYSTEM AND METHOD FOR DETERMINING ACCUMULATION OF SILICONE DIOXIDE (SIO₂) IN AN AFTERTREATMENT SYSTEM

(71) Applicant: Caterpillar Inc., Deerfield, IL (US)

(72) Inventors: John B. Edelin, Clayton, NC (US); Daniel A. Cockman, II, Cary, NC (US); Gavin D. O. Ripley, Garner, NC (US)

(73) Assignee: Caterpillar Inc., Peoria, IL (US)

( * ) Notice: Subject to any disclaimer, the term of this patent is extended or adjusted under 35 U.S.C. 154(b) by 34 days.

(21) Appl. No.: 16/155,980

(22) Filed: Oct. 10, 2018

(65) Prior Publication Data
US 2020/0116067 A1 Apr. 16, 2020

(51) Int. Cl.
*F01N 11/00* (2006.01)
*F02B 37/00* (2006.01)

(52) U.S. Cl.
CPC ............ *F01N 11/002* (2013.01); *F02B 37/00* (2013.01); *F01N 2900/1406* (2013.01); *F01N 2900/16* (2013.01)

(58) Field of Classification Search
CPC combination set(s) only.
See application file for complete search history.

(56) References Cited

U.S. PATENT DOCUMENTS

| | | | |
|---|---|---|---|
| 5,079,921 A | 1/1992 | McCandless et al. | |
| 5,261,271 A | 11/1993 | Bihn et al. | |
| 5,373,733 A | 12/1994 | Fuchs et al. | |
| 6,418,719 B2 | 7/2002 | Terry et al. | |
| 6,708,104 B2 | 3/2004 | Avery, Jr. et al. | |
| 6,827,754 B2 * | 12/2004 | Suwabe | B01D 46/2459 55/523 |
| 6,939,825 B1 * | 9/2005 | Ohno | B01D 53/945 423/326 |
| 10,124,322 B2 * | 11/2018 | Biberger | B01J 23/63 |
| 10,408,108 B2 * | 9/2019 | Volmerding | B01D 53/9495 |

(Continued)

FOREIGN PATENT DOCUMENTS

CN 203551285 4/2014
WO 2005070175 W 8/2005

*Primary Examiner* — Binh Q Tran

(57) ABSTRACT

A system for determining accumulation of Silicone dioxide (SiO₂) in an aftertreatment system of an engine includes a pressure sensor arrangement having at least one pressure sensor therein. The pressure sensor is fluidly coupled to an exhaust pipe associated with the aftertreatment system. A controller is disposed in communication with the pressure sensor. The controller is configured to monitor back pressure of the aftertreatment system from at least one signal output by the pressure sensor arrangement and determine a level of accumulation of Sift in the aftertreatment system based on the monitored back pressure of the aftertreatment system. Based on the determination of the level of accumulation of Sift in the aftertreatment system by the controller, the controller outputs a signal to a notification device for facilitating the notification device to notify an operator of the level of accumulation of SiO₂ in the aftertreatment system.

20 Claims, 4 Drawing Sheets

(56) References Cited

U.S. PATENT DOCUMENTS

| | | | |
|---|---|---|---|
| 2012/0186240 A1* | 7/2012 | Tanaka | F01N 3/0222 60/311 |
| 2013/0013166 A1 | 1/2013 | Petrovic et al. | |
| 2016/0194991 A1 | 7/2016 | Clayton, Jr. | |
| 2016/0258392 A1 | 9/2016 | Harris | |
| 2017/0146440 A1 | 5/2017 | Zhang | |
| 2017/0175689 A1 | 6/2017 | Clayton | |

* cited by examiner

SYSTEM AND METHOD FOR DETERMINING ACCUMULATION OF SILICONE DIOXIDE (SIO$_2$) IN AN AFTERTREATMENT SYSTEM

TECHNICAL FIELD

The present disclosure relates to an aftertreatment system, and more particularly, to a system and a method for determining an accumulation of Silicone dioxide (SiO$_2$) in an aftertreatment system of an engine.

BACKGROUND

It is well known in the art to provide an aftertreatment system for treating exhaust gases exiting an engine. In order to achieve optimal performance output from the engine and an optimal conversion performance by the aftertreatment system in treating the exhaust gases exiting the engine, it may be prudent to monitor a condition of the aftertreatment system.

U.S. Pat. No. 6,708,104 (hereinafter referred to as "the '104 patent) discloses a system for controlling an internal combustion engine by monitoring exhaust back pressure and taking remedial action when the exhaust back pressure exceeds a corresponding threshold. The system of the '104 patent responds to increased exhaust back pressures, attributable to various causes, to alert the vehicle operator and engage engine protection mechanisms depending on the back-pressure severity level in an effort to avoid damage to the engine or its components. Further, in response to excessive exhaust back pressure, the system of the '104 patent is also configured to reduce an amount of torque available from the engine.

However, when the engine and the aftertreatment system are used in certain environments such as a land fill or a dump site where Siloxanes may be abundantly present, these Siloxanes could enter one or more cylinders of the engine. Upon entering the cylinders of the engine, these Siloxanes could be combusted to form Silicon dioxide (SiO$_2$) that could clog and hence, impede an operation of the aftertreatment system. With clogging of the aftertreatment system, a concomitant increase may be observed in the back-pressure of the exhaust gases upstream of the aftertreatment system. This increased exhaust back-pressure may in turn impede an operation of the engine, due at least in part, to the engine now requiring an increased amount of exhaust pressure to expel the exhaust gases. Although the system of the '104 patent monitors the exhaust back-pressure, the system of the '104 patent is also designed to carry out a remedial action in the form of engine torque derate when the exhaust back-pressure increases above a certain threshold. The autonomous execution of remedial actions, by the system of the '104 patent by way of engine torque de-rate could, in turn, be counterproductive to the engine and the aftertreatment system as power output from the engine may become less than adequate to meet load demands while little or no recommendation may be provided by the system of the '104 patent in regard to maintenance of the aftertreatment system.

Hence, in view of the foregoing drawbacks, there exists a need for a system that determines accumulation of Silicone dioxide (SiO$_2$) in an aftertreatment system of an engine.

SUMMARY OF THE DISCLOSURE

In an aspect of the present disclosure, a system for determining accumulation of Silicone dioxide (SiO$_2$) in an aftertreatment system of an engine includes a pressure sensor arrangement having at least one pressure sensor therein. The pressure sensor is fluidly coupled to an exhaust pipe associated with the aftertreatment system. A controller is disposed in communication with the pressure sensor. The controller is configured to monitor back pressure of the aftertreatment system from at least one signal output by the pressure sensor arrangement and determine a level of accumulation of SiO$_2$ in the aftertreatment system based on the monitored back pressure of the aftertreatment system. A notification device is disposed in communication with the controller. Based on the determination of the level of accumulation of SiO$_2$ in the aftertreatment system by the controller, the controller outputs a signal to a notification device for facilitating the notification device to notify an operator of the level of accumulation of SiO$_2$ in the aftertreatment system.

In another aspect of this disclosure, a method for determining an accumulation of Silicone dioxide (SiO$_2$) in an aftertreatment system of an engine includes fluidly coupling at least one pressure sensor of a pressure sensor arrangement to an exhaust pipe associated with the aftertreatment system. The method also includes monitoring, by means of a controller, a back pressure of the aftertreatment system from at least one signal output by the pressure sensor arrangement. Further, the method includes determining, by means of the controller, a level of accumulation of SiO$_2$ in the aftertreatment system based on the monitored back pressure of the aftertreatment system. Furthermore, the method also includes notifying, by means of a notification device, an operator of the level of accumulation of SiO$_2$ in the aftertreatment system based on the determined level of accumulation of SiO$_2$ in the aftertreatment system by the controller.

Other features and aspects of this disclosure will be apparent from the following description and the accompanying drawings.

DETAILED DESCRIPTION

Figure 1:
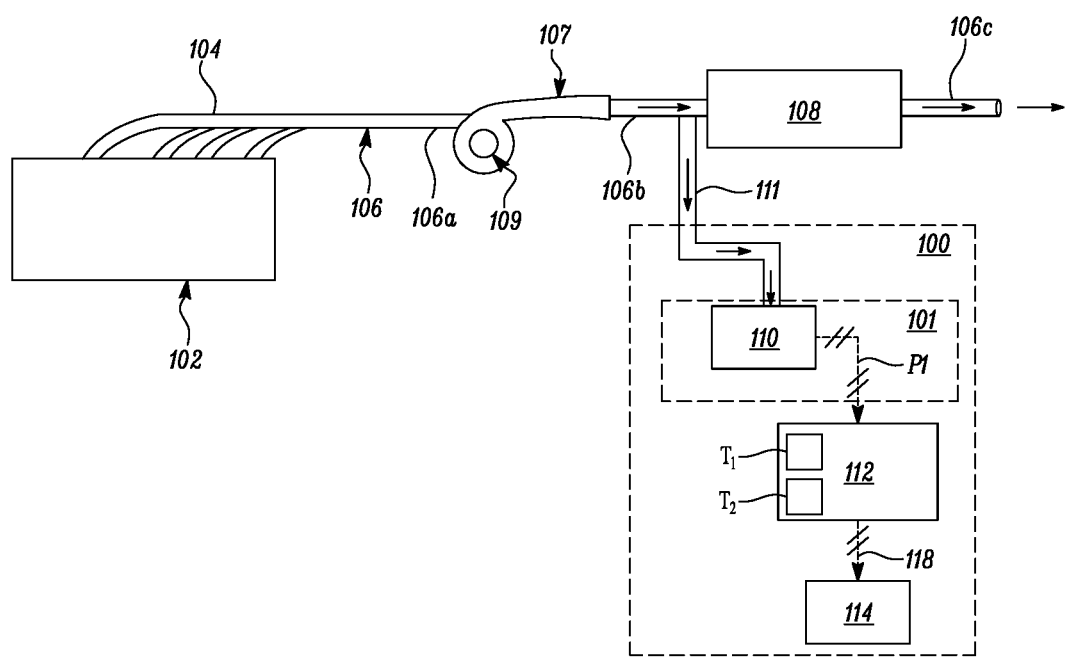
FIG. 1 is a diagrammatic representation of a system for determining accumulation of Silicone dioxide (Sift) in an aftertreatment system of an engine, the system showing a pressure sensor arrangement having a first pressure sensor coupled to an exhaust pipe section upstream of the aftertreatment system in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

FIG. 1 illustrates a system 100 for determining accumulation of Silicone dioxide ($SiO_2$) in an aftertreatment system 108 of an engine 102. In an embodiment herein, the engine 102 is an internal combustion engine. Further, the engine 102 disclosed herein may be embodied a multi-cylinder engine, for example, a four-cylinder engine. Although a multi-cylinder engine is used to embody the engine 102 herein, in other embodiments, the engine 102 could be embodied to include fewer or more cylinders than that disclosed herein. For example, a single-cylinder engine may be employed in lieu of a multi-cylinder engine to form the engine 102 disclosed herein.

Further, as shown, the engine 102 is provided with an exhaust manifold 104 and an exhaust pipe 106 disposed downstream of the exhaust manifold 104. Upon combustion of a fuel and air mixture, exhaust gases are routed from the engine 102 to the aftertreatment system 108 via the exhaust manifold 104 and the exhaust pipe 106. In an embodiment of this disclosure, the aftertreatment system 108 includes a diesel particulate filter (DPF) (not shown). However, in other embodiments, the aftertreatment system 108 may be configured to additionally include a catalytic converter and/or a diesel oxidation catalyst (DOC) therein.

Also, as shown in this embodiment, a turbocharger 107 may be present between the engine 102 and the aftertreatment system 108. This turbocharger 107 would be fluidly coupled to the exhaust manifold 104 with the help of an exhaust pipe section 106a. Further, the turbocharger 107 would be fluidly coupled to the aftertreatment system 108 with the help of another exhaust pipe section 106b. Additionally, the aftertreatment system 108 would also be provided with yet another exhaust pipe section 106c located downstream thereof.

The system 100 includes a pressure sensor arrangement 101 having at least one pressure sensor therein. As shown in the illustrated embodiment of FIG. 1, the pressure sensor arrangement 101 includes a first pressure sensor 110 that is fluidly coupled to the exhaust pipe section 106b. The first pressure sensor 110 is located upstream of the aftertreatment system 108 and downstream of the engine 102. This first pressure sensor 110 would be configured to output a first signal indicative of a pressure $P_1$ of exhaust gases upstream of the aftertreatment system 108. It is hereby contemplated that in embodiments herein, the first pressure sensor 110 would be fluidly coupled to the exhaust pipe section 106b using a thermal reduction conduit 111, for example, a braided steel hose. This thermal reduction conduit 111 could dissipate heat and hence, reduce a temperature associated with the exhaust gases passing therethrough before reaching the first pressure sensor 110.

The system 100 also includes a controller 112 that is disposed in communication with the pressure sensor arrangement 101. As shown in the illustrated embodiment of FIG. 1, the controller 112 is shown communicably coupled to the first pressure sensor 110. The controller 112 is configured to monitor back pressure of the aftertreatment system 108 from at least one signal output by the pressure sensor arrangement 101 and determine a level of accumulation of $SiO_2$ in the aftertreatment system 108 based on the monitored back pressure of the aftertreatment system 108.

The controller 112 then compares the pressure $P_1$ associated with the first signal with one or more pre-defined threshold values preset at the controller 112. The controller 112 then determines the level of accumulation of $SiO_2$ in the aftertreatment system 108 based on the comparison. As shown in the illustrated embodiment of FIG. 1, the pre-defined threshold values may include a first threshold value $T_1$ and a second threshold value $T_2$ that is greater than the first threshold value $T_1$. These pre-defined threshold values $T_1$, $T_2$ may be pre-set at the controller 112. It will be appreciated that the controller 112 disclosed herein can include a read-only memory (ROM), a random-access memory (RAM), suitable circuitry, control logic, and other hardware and software components that are configured to perform functions consistent with the present disclosure.

The system 100 also includes a notification device 114 that is disposed in communication with the controller 112. This notification device 114 may embody, for example, a graphical user interface (GUI) capable of displaying data thereon. In embodiments herein, based on the determination of the level of accumulation of Sift in the aftertreatment system 108 by the controller 112, the controller 112 outputs a signal to a notification device 114 for facilitating the notification device 114 to notify an operator of the level of accumulation of $SiO_2$ in the aftertreatment system 108. In embodiments herein, the notification device 114 may notify the operator of the level of accumulation of Sift in the aftertreatment system 108 via a visual indication thereon. However, it may be noted that a type of indication provided by the notification device 114 is non-limiting of this disclosure. Other types of indication including but not limited to, an alarm, a haptic feedback may be provided by the notification device 114 in lieu of, or in addition to the visual indication.

In this embodiment, during operation of the system 100, the controller 112 receives the first signal indicative of the pressure $P_1$ of exhaust gases upstream of the aftertreatment system 108 from the first pressure sensor 110. The controller 112 then compares the pressure $P_1$ with the first and second threshold values $T_1$, $T_2$. Upon comparison, if the controller 112 determines that the pressure $P_1$ upstream of the aftertreatment system 108 exceeds the first threshold value $T_1$, then the controller 112 provides a first output signal to the notification device 114 for notifying the operator of a first level of accumulation of Sift in the aftertreatment system 108. However, upon comparison, if the controller 112 determines that the pressure $P_1$ upstream of the aftertreatment system 108 exceeds the second threshold value $T_2$, then the controller 112 provides a second output signal to the notification device 114 for notifying the operator of a second level of accumulation of Sift in the aftertreatment system 108 indicating that maintenance is required on the aftertreatment system 108.

Figure 2:
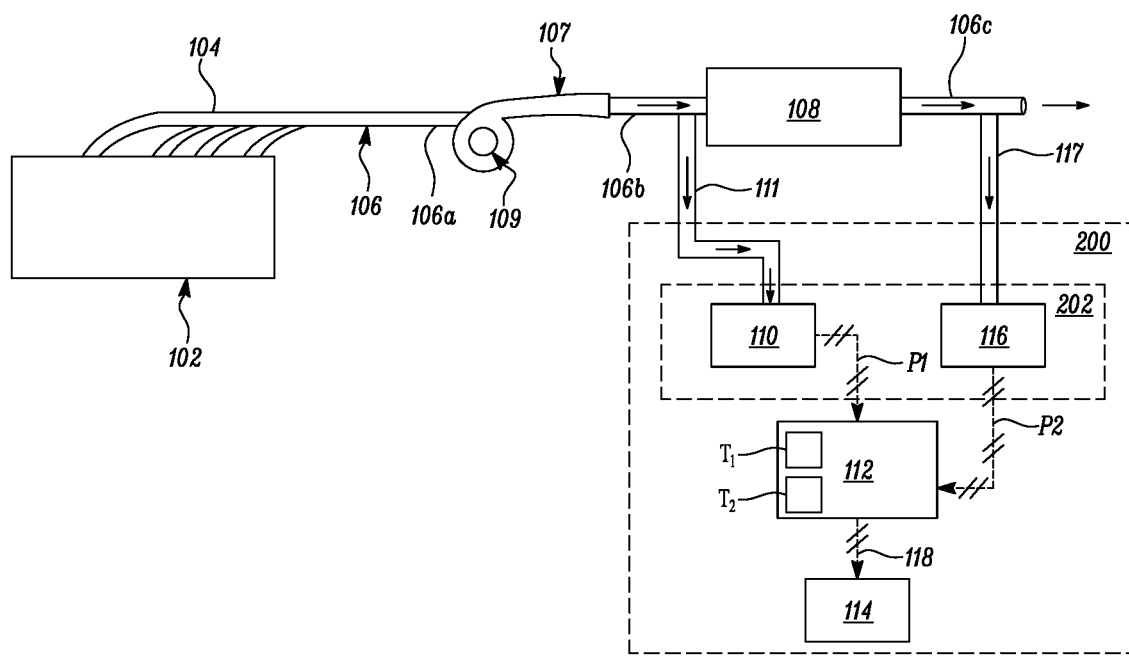
FIG. 2 is a diagrammatic representation of the system for determining accumulation of Silicone dioxide (Sift) in the aftertreatment system of the engine, the system showing a pressure sensor arrangement having the first pressure sensor and a second pressure sensor in accordance with another embodiment of the present disclosure.

In another embodiment as shown in FIG. 2, a system 200 is provided for determining accumulation of Silicone dioxide (Sift) in the aftertreatment system 108 of the engine 102. In this embodiment, the system 200 includes the first pressure sensor 110, the controller 112, and the notification device 114. Additionally, the system 200 also includes a second pressure sensor 116 fluidly coupled to the exhaust pipe section 106c located downstream of the aftertreatment system 108. This second pressure sensor 116 is configured to output a second signal indicative of a pressure $P_2$ of the exhaust gases downstream of the aftertreatment system 108.

In this embodiment, the controller 112 is configured to determine a difference between the pressures $P_1$, $P_2$ of the exhaust gases upstream and downstream of the aftertreatment device from the first and second signals i.e., $P_1$-$P_2$. The controller 112 then compares the difference with one or more pre-defined threshold values preset at the controller 112 and determines the level of accumulation of $SiO_2$ in the aftertreatment system 108 based on the comparison.

In this embodiment, upon comparison, if the controller 112 determines that the difference ($P_1$-$P_2$) between the pressures $P_1$, $P_2$ upstream and downstream of the aftertreatment system 108 exceeds the first threshold value $T_1$, then the controller 112 provides a first output signal for notifying the operator of a first level of accumulation of $SiO_2$ in the aftertreatment system 108. However, upon comparison, if the controller 112 determines that the difference ($P_1$-$P_2$) between the pressures $P_1$, $P_2$ upstream and downstream of the aftertreatment system 108 exceeds the second threshold value $T_2$, then the controller 112 provides a second output signal to notify the operator of a second level of accumulation of $SiO_2$ in the aftertreatment system 108 indicating that maintenance is required on the aftertreatment system 108.

Figure 3:
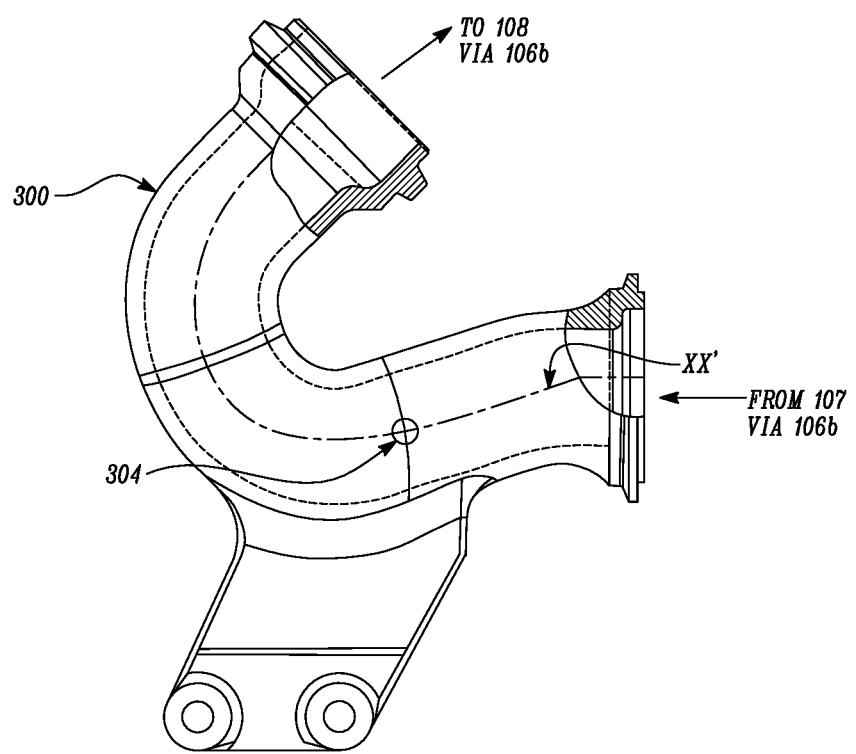
FIG. 3 illustrates an elbow section that can be used for mounting the first pressure sensor.

In an embodiment as shown in FIG. 3, an elbow section 300 is depicted. Referring to FIGS. 1, 2, and 3, this elbow section 300 can be installed into the exhaust pipe section 106b between the turbocharger 107 and the aftertreatment system 108. Exhaust gases exiting a turbine 109 of the turbocharger 107 could be routed via the elbow section 300 disclosed herein. A point 304 shown located on a neutral axis XX' of this elbow section 300 may be drilled and tapped for coupling the thermal reduction conduit 111, depicted in FIGS. 1 and 2 respectively, with the elbow section 300. It is hereby envisioned that with use of the elbow section 300 and by locating the point 304 on the neutral axis XX' of the elbow section 300, a portion of exhaust gases, adjacent the point 304 on the elbow section 300, that is routed via the thermal reduction conduit 111 would be free of bias in pressure from effects of the turbine 109 associated with the turbocharger 107.

Figure 4:
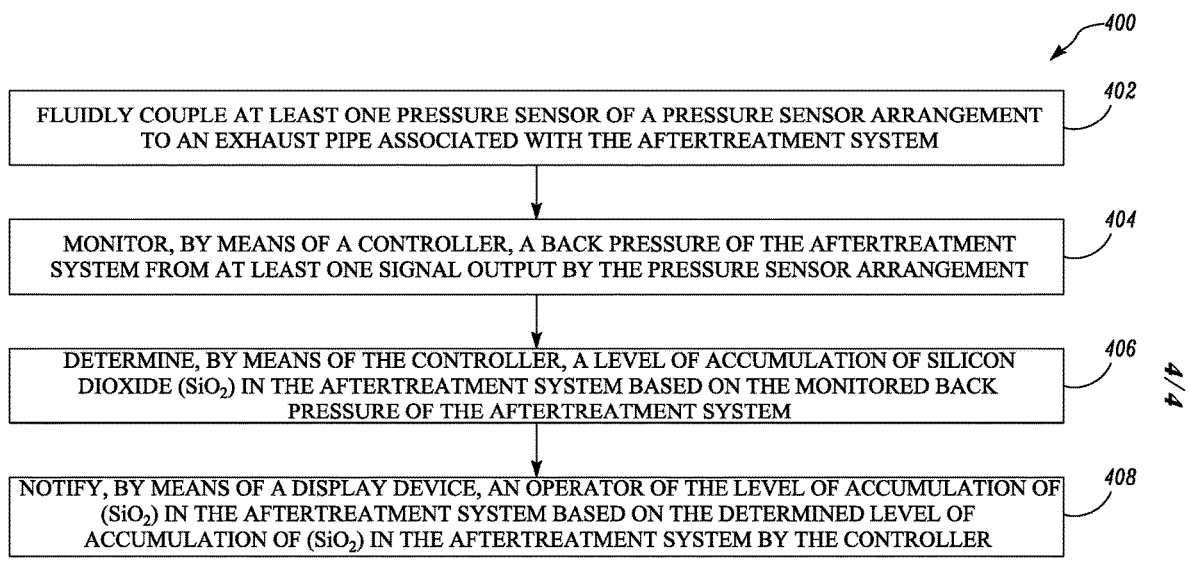
FIG. 4 is a flowchart of a method for determining accumulation of Silicone dioxide (SiO$_2$) in the aftertreatment system of the engine, in accordance with an embodiment of the present disclosure.

FIG. 4 illustrates a method 400 for determining an accumulation of Silicone dioxide ($SiO_2$) in the aftertreatment system 108 of the engine 102, according to an embodiment of the present disclosure. As shown, at step 402, the method 400 includes fluidly coupling at least one pressure sensor of the pressure sensor arrangement 101/202 to the exhaust pipe 106 associated with the aftertreatment system 108. At step 404, the method further includes monitoring, by means of the controller 112, the back pressure ($P_1$ alone, or $P_1$ and $P_2$) of the aftertreatment system 108 from at least one signal output by the pressure sensor arrangement 101/202. Further, at step 406, the method 400 also includes determining, by means of the controller 112, the level of accumulation of $SiO_2$ in the aftertreatment system 108 based on the monitored back pressure of the aftertreatment system 108. Furthermore, at step 408, the method 400 also includes notifying, by means of the notification device 114, the operator of the level of accumulation of $SiO_2$ in the aftertreatment system 108 based on the determined level of accumulation of $SiO_2$ in the aftertreatment system 108 by the controller 112.

Various embodiments disclosed herein are to be taken in the illustrative and explanatory sense, and should in no way be construed as limiting of the present disclosure. All joinder references (e.g., associated, provided, connected, coupled and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to or over another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure has applicability for use and implementation in determining accumulation of Silicone dioxide ($SiO_2$) in an aftertreatment system of an engine. Embodiments of the present disclosure provide a system 100/200 and a method 400 that are configured to notify an operator of the accumulating $SiO_2$ in the aftertreatment system 108 thereby forewarning the operator if the accumulated $SiO_2$ in the aftertreatment system 108 has exceeded the first threshold value $T_1$ and by facilitating the operator to carry out maintenance on the aftertreatment system 108 when the accumulated $SiO_2$ in the aftertreatment system 108 has exceeded the second threshold value $T_2$.

Conventional systems for monitoring back-pressure were typically designed to execute an automated remedial action such as derating available engine 102 torque. However, derating the torque of an engine 102 as a remedial measure may be counterproductive in the interest of work output by the engine 102 to meet load demands. On the contrary, with use of the system 100/200 disclosed herein, when the controller 112 notifies the operator that the accumulated $SiO_2$ in the aftertreatment system 108 has exceeded the second threshold value $T_2$, the operator also has the flexibility to select a type and nature of maintenance that is required on the aftertreatment system 108 and can perform the required maintenance routines on the aftertreatment system 108. These maintenance routines may vary from cleaning the aftertreatment system 108, overhauling the aftertreatment system 108, or even replacing the aftertreatment system 108.

Moreover, with use of embodiments disclosed herein, manufacturers of machines that employ engines and aftertreatment systems can easily retrofit the system of the present disclosure onto such machines by following a simple installation procedure i.e., by installing the elbow section 300 onto the exhaust pipe 106 and coupling the thermal reduction hose for subsequently mounting the first pressure sensor 110 in a manner that prevents the first pressure sensor 110 from being exposed to excessive heat of the exhaust gases during operation of the engine 102. In addition, it is hereby envisioned that this procedure and setup can be implemented for installing the pressure sensor arrangement 101/202 and hence, the system 100/200 at an economical cost.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof

What is claimed is:

1. A system for determining accumulation of Silicone dioxide ($SiO_2$) in an aftertreatment system of an engine, the system comprising:
   a pressure sensor arrangement having at least one pressure sensor therein, the at least one pressure sensor fluidly coupled to an exhaust pipe associated with the aftertreatment system;
   a controller disposed in communication with the pressure sensor, the controller configured to:
      monitor back pressure of the aftertreatment system from at least one signal output by the pressure sensor arrangement; and
      determine a level of accumulation of $SiO_2$ in the aftertreatment system based on the monitored back pressure of the aftertreatment system; and
   a notification device in communication with the controller, wherein based on the determination of the level of accumulation of $SiO_2$ in the aftertreatment system by the controller, the controller outputs a signal to the notification device for facilitating the notification device to notify an operator of the level of accumulation of $SiO_2$ in the aftertreatment system.

2. The system of claim 1, wherein the pressure sensor arrangement includes a first pressure sensor fluidly coupled to the exhaust pipe, the first pressure sensor located upstream of the aftertreatment system and downstream of the engine.

3. The system of claim 2, wherein the first pressure sensor is located downstream of a turbine of a turbocharger that is associated with the engine.

4. The system of claim 2, wherein the first pressure sensor is configured to output a first signal indicative of a pressure of exhaust gases upstream of the aftertreatment system.

5. The system of claim 4, wherein the pressure sensor arrangement includes a second pressure sensor fluidly coupled to the exhaust pipe and located downstream of the aftertreatment system.

6. The system of claim 5, wherein the second pressure sensor is configured to output a second signal indicative of the pressure of the exhaust gases downstream of the aftertreatment system.

7. The system of claim 6, wherein the controller is configured to:
   determine a difference between the pressures of the exhaust gases upstream and downstream of the aftertreatment device from the first and second signals; and
   compare the difference with one or more pre-defined threshold values preset at the controller; and
   determine the level of accumulation of $SiO_2$ in the aftertreatment system based on the comparison.

8. The system of claim 7, wherein the controller is configured to:
   determine if the difference between the pressures upstream and downstream of the aftertreatment system exceeds a first threshold value, and
   provide a first output signal based on the determination that the difference between the pressures upstream and downstream of the aftertreatment system exceeds the first threshold value, the first output signal configured to notify the operator of a first level of accumulation of $SiO_2$ in the aftertreatment system.

9. The system of claim 8, wherein the controller is configured to:
   determine if the difference between the pressures upstream and downstream of the aftertreatment system exceeds a second threshold value greater than the first threshold value, and
   provide a second output signal based on the determination that the difference between the pressures upstream and downstream of the aftertreatment system exceeds the second threshold value, the second output signal configured to notify the operator of a second level of accumulation of $SiO_2$ in the aftertreatment system indicating that maintenance is required on the aftertreatment system.

10. The system of claim 1, wherein at least one pressure sensor of the pressure sensor arrangement is fluidly coupled to an elbow section of the exhaust pipe located upstream of the aftertreatment system by a thermal reduction conduit.

11. A method for determining an accumulation of Silicone dioxide ($SiO_2$) in an aftertreatment system of an engine, the method comprising:
   fluidly coupling at least one pressure sensor of a pressure sensor arrangement to an exhaust pipe associated with the aftertreatment system;
   monitoring, by means of a controller, a back pressure of the aftertreatment system from at least one signal output by the pressure sensor arrangement;
   determining, by means of the controller, a level of accumulation of $SiO_2$ in the aftertreatment system based on the monitored back pressure of the aftertreatment system; and
   notifying, by means of a notification device, an operator of the level of accumulation of $SiO_2$ in the aftertreatment system based on the determined level of accumulation of $SiO_2$ in the aftertreatment system by the controller.

12. The method of claim 11 further comprising fluidly coupling a first pressure sensor of the pressure sensor arrangement to the exhaust pipe at a point located upstream of the aftertreatment system and downstream of the engine.

13. The method of claim 12 further comprising locating the first pressure sensor downstream of a turbine of a turbocharger that is associated with the engine.

14. The method of claim 12 further comprising outputting, by means of the first pressure sensor, a first signal indicative of a pressure of exhaust gases upstream of the aftertreatment system.

15. The method of claim 14 further comprising fluidly coupling a second pressure sensor to the exhaust pipe at a point located downstream of the aftertreatment system.

16. The method of claim 15 further comprising outputting, by means of the second pressure sensor, a second signal indicative of the pressure of the exhaust gases downstream of the aftertreatment system.

17. The method of claim 16 further comprising monitoring, by means of the controller, the back pressure by:
   determining, by means of the controller, a difference between the pressures of the exhaust gases upstream and downstream of the aftertreatment device from the first and second signals; and
   comparing, by means of the controller, the difference with one or more pre-defined threshold values preset at the controller; and
   determining, by means of the controller, the level of accumulation of $SiO_2$ in the aftertreatment system based on the comparison.

18. The method of claim 17 further comprising:
determining, by the controller, if the difference between the pressures upstream and downstream of the aftertreatment system exceeds a first threshold value, and
providing, by the controller, a first output signal based on the determination by the controller that the difference between the pressures upstream and downstream of the aftertreatment system exceeds the first threshold value, the first output signal configured to notify the operator of a first level of accumulation of $SiO_2$ in the aftertreatment system.

19. The method of claim 18 further comprising:
determining, by the controller, if the difference between the pressures upstream and downstream of the aftertreatment system exceeds a second threshold value greater than the first threshold value, and
providing, by the controller, a second output signal based on the determination by the controller that the difference between the pressures upstream and downstream of the aftertreatment system exceeds the second threshold value, the second output signal provided to notify the operator of a second level of accumulation of $SiO_2$ in the aftertreatment system indicating that maintenance is required on the aftertreatment system.

20. The method of claim 11 further comprising fluidly coupling at least one pressure sensor of the pressure sensor arrangement to an elbow section of the exhaust pipe located upstream of the aftertreatment system by a thermal reduction conduit.

\* \* \* \* \*